(12) United States Patent
Hasegawa et al.

(10) Patent No.: US 6,842,939 B1
(45) Date of Patent: Jan. 18, 2005

(54) WIPER PIVOT DEVICE

(75) Inventors: Takashi Hasegawa, Kosai (JP);
Yoshimasa Sato, Shizuoka-ken (JP);
Yuji Watanabe, Anjo (JP)

(73) Assignee: Asmo Co., Ltd., Shizuoka-ken (JP)

( * ) Notice: Subject to any disclaimer, the term of this patent is extended or adjusted under 35 U.S.C. 154(b) by 294 days.

(21) Appl. No.: 09/762,323

(22) PCT Filed: Jun. 2, 2000

(86) PCT No.: PCT/JP00/03594
§ 371 (c)(1),
(2), (4) Date: Feb. 5, 2001

(87) PCT Pub. No.: WO00/74984
PCT Pub. Date: Dec. 14, 2000

(30) Foreign Application Priority Data

Jun. 4, 1999 (JP) ............................................ 11-158772

(51) Int. Cl.$^7$ ................................ B60S 1/34; B60S 1/04
(52) U.S. Cl. ................ 15/250.31; 15/250.3; 403/DIG. 3
(58) Field of Search ........................... 15/250.3, 250.31, 15/250.34, 250.27; 403/DIG. 3; 384/903

(56) References Cited

U.S. PATENT DOCUMENTS 5,287,771 A * 2/1994 Blanchet .................... 74/606 R
5,735,171 A * 4/1998 Moote et al. ................... 74/42
6,138,320 A * 10/2000 Komo ..................... 15/250.31
6,317,918 B1 * 11/2001 Kagawa et al. .......... 15/250.31

FOREIGN PATENT DOCUMENTS

| DE | 19851881 A1 | 5/1999 |
| EP | 0806329 A2 | 11/1997 |
| EP | 0916559 A2 | 5/1999 |
| JP | UM Pub. 60-261 | 1/1985 |
| JP | 06042475 | 2/1994 |
| JP | 09150714 | 6/1997 |
| JP | 11048917 | 2/1999 |
| JP | 11124013 | 5/1999 |
| JP | 11124014 | 5/1999 |
| JP | 11139256 | 5/1999 |
| JP | 11165613 | 6/1999 |
| JP | 11301420 | 11/1999 |

* cited by examiner

*Primary Examiner*—Gary K. Graham
(74) *Attorney, Agent, or Firm*—Nath & Associates; Harold L. Novick

(57) ABSTRACT

The wiper pivot unit for smoothly absorbing a load applied from the outside of a vehicle. The wiper pivot (1) has a pivot shaft (3), a pivot holder (4) and a toothed washer (5). The pivot shaft has a small-diameter section (31) and a large-diameter section (32). The toothed washer is fitted on the large-diameter section to constrict it with a predetermined force. The toothed washer slips off the large-diameter section when a load of a predetermined value or more acts upon the pivot shaft. When the toothed washer is shifted to the small-diameter section, the pivot shaft descends smoothly along the pivot holder.

17 Claims, 6 Drawing Sheets

WIPER PIVOT DEVICE

BACKGROUND OF THE INVENTION

The present invention relates to a wiper pivot unit of a vehicle wiper.

Wipers for wiping windshield glass of vehicles are generally provided with pivot shafts having wiper arms attached to their tips, respectively. Each pivot shaft is rotatably supported by a pivot holder, which is fixed to a vehicle body, and the tip of the pivot shaft protrudes outward from the vehicle body. A pivot lever is fixed at one end to the proximal end of the pivot shaft, and a link rod is connected to the other end of the pivot lever. The link rod converts the rotary movement of a wiper motor into a swinging motion. The swinging motion of the link rod is reconverted by the pivot lever into rotary motion on the pivot shaft. The rotation of the pivot shaft pivotally reciprocates the wiper arm together with a wiper blade in a predetermined range, and the wiper blade wipes raindrops, mud and so on from the surface of the windshield glass.

However, in the conventional wiper, the pivot shaft protrudes outward from the surface of the vehicle body so that a wiper arm can be attached to the distal end of the pivot shaft. Therefore, the pivot shaft is susceptible to external impacts and loads. An impact or a load applied to the pivot shaft can damage the wiper itself and the periphery thereof.

In order to prevent such damage, Japanese Unexamined Patent Publication No. Hei 11-139256 discloses a wiper. In this wiper, a pivot shaft retracts into the vehicle body when it is subjected to a load exerted from the outside of the vehicle and absorbs the load.

More specifically, in this wiper, a constriction or an annular groove is formed at the middle part of the pivot shaft. A C-ring (a severed ring) is fitted to the annular groove. In the normal service condition, abutment of the distal end face of the pivot holder against the C-ring prevents axial movement of the pivot shaft with respect to the pivot holder.

The annular groove has a tapered side wall. When a load is applied to the wiper along the pivot shaft from the outside of a vehicle, the C-ring is expanded by the tapered side wall and escapes from the annular groove. Thus, axial movement of the pivot shaft is no longer prevented, and the pivot shaft retracts into the vehicle body to absorb the impact load.

However, in this wiper, a C-ring that has slipped out of the annular groove constricts the pivot shaft strongly, so that the pivot shaft resists being moved axially. In addition, the level of this resistance is not constant.

Accordingly, even if the axial movement of the pivot shaft is not presented by the C-ring, axial movement of the pivot shaft is restricted by the unstable and great resistance and by the reactive forces of the movement of the link rod connected to the pivot shaft through a lever fixed thereto and of a wiper motor. Also, there is a design problem in that it is difficult to set a threshold load for permitting axial movement of the pivot shaft.

SUMMARY OF THE INVENTION

An object of the present invention is to provide a wiper pivot that can absorb thrust loads that is applied to its pivot shaft and that can facilitate setting of a threshold load value.

In order to attain the above object, the wiper pivot unit according to a first aspect of the present invention is provided with a pivot shaft having a distal end to which a wiper arm is fixed and a proximal end; a pivot holder fixed to a vehicle body; a bearing portion formed in the pivot holder to support rotatably the pivot shaft; and a locking member for restricting axial movement of the pivot shaft with respect to the bearing portion. The pivot shaft includes a small-diameter section formed over a predetermined length from the distal end side, and a large-diameter section having a diameter larger than that of the small-diameter section formed on the proximal end side. The locking member is locked with a predetermined frictional force against a part of the large-diameter section in the vicinity of the small-diameter section. When a thrust load of a predetermined value or more applied to the pivot shaft toward the proximal end thereof, the restriction of axial movement of the pivot shaft by the locking member is removed to allow the pivot shaft to shift with respect to the bearing portion and also to allow the locking member to shift to the small-diameter section, thus reducing the frictional force.

The wiper pivot unit according to a second aspect of the present invention is provided with a pivot shaft having a distal end and a proximal end and also having a wiper arm fixed to the distal end; a pivot holder fixed to a body of a vehicle; a bearing portion formed in the pivot holder to support rotatably the pivot shaft; and a locking member for restricting axial movement of the pivot shaft with respect to the pivot holder. The pivot shaft includes a small-diameter section formed over a predetermined length from the distal end side, and a large-diameter section having a diameter larger than that of the small-diameter section formed on the proximal end side. The locking member includes a toothed washer having a plurality of locking pieces protruding inward. Tips of these locking pieces define a through hole. The toothed washer is locked against a part of the large-diameter section in the vicinity of the small-diameter section to constrict that portion with a predetermined constricting force. The diameter of the small-diameter section, the diameter of the large-diameter section and the inside diameter of the toothed washer before it is fitted to the pivot shaft are designed to allow the toothed washer to give a kinetic frictional force of half as much as or less than a maximum static friction to be exhibited when the restriction of axial movement of the pivot shaft is canceled to allow the pivot shaft to shift with respect to the bearing portion.

Preferably, the predetermined frictional force is a result of a constricting force of the locking member against the outer surface of the pivot shaft.

It is preferred that the small-diameter section protrudes entirely from the bearing portion and that the large-diameter section is located in the bearing portion in the state where the locking member restricts axial movement of the pivot shaft.

The small-diameter section preferably has a fixed diameter along the axis of the pivot shaft and protrudes from the bearing portion.

It is preferred that the pivot shaft additionally has at the distal end side than the small-diameter section a fixing section for fixing the wiper arm and that the small-diameter section is formed over a predetermined length between the fixing section and the large-diameter section.

The locking member is preferably a toothed washer having a plurality of locking pieces protruding inward, which define a through hole. The small-diameter section preferably has a diameter smaller than the inside diameter of the through hole of the toothed washer before it is fitted to the pivot shaft.

The pivot shaft preferably has a tapered face connecting the large-diameter section to the small-diameter section.

The fixing section preferably has a tapered rotation preventing portion having a knurled surface and a threaded portion formed on the distal end side of the rotation preventing portion.

The locking member is preferably a ring-shaped toothed washer having a plurality of locking pieces protruding inward, which define a through hole. The diameter of the small-diameter section, the diameter of the large-diameter section and the inside diameter of the through hole of the toothed washer before it is fitted to the pivot shaft are preferably designed to give a kinetic frictional force between the toothed washer and the small-diameter section of half as much as or less than a maximum static friction to be exhibited when the toothed washer constricts the large-diameter section.

The diameter of the small-diameter section, the diameter of the large-diameter section and the inside diameter of the through hole of the toothed washer before it is fitted to the pivot shaft are preferably designed to produce a kinetic frictional force of zero when the toothed washer is shifted to the small-diameter section.

The locking member is preferably an unsevered ring-shaped toothed washer having a plurality of locking pieces protruding inward.

DETAILED DESCRIPTION OF THE PREFERRED EMBODIMENTS

Figure 1:
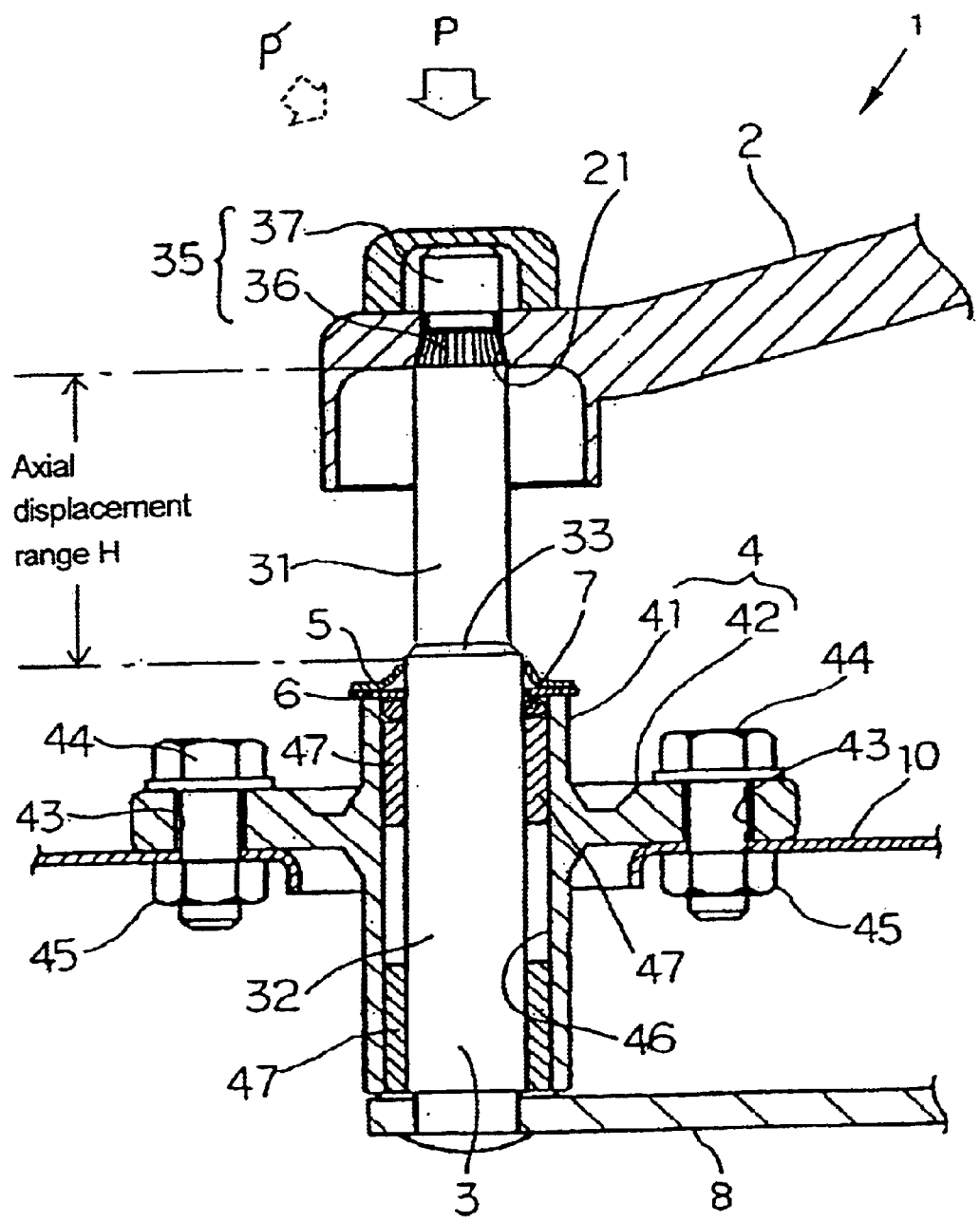
FIG. 1 is a cross-sectional view of a wiper pivot according to a first embodiment of the present invention.

FIG. 1 shows a wiper pivot 1 according to a first embodiment of the present invention, which is applied to a vehicle. The wiper pivot 1 has a pivot shaft 3, axial movement of which is restricted. A pair of wiper pivots 1 are located in front of a front glass of a vehicle (not shown) at the lower edge of the glass and are spaced apart. A wiper arm 2 is fixed to the pivot shaft 3 of each wiper pivot 1. When the pivot shaft 3 is pivoted, a wiper blade (not shown) attached to the wiper arm 2 wipes the glass surface.

The wiper pivot 1 has a pivot holder 4. The pivot holder 4 is molded using, for example, an aluminum alloy into a substantially cylindrical shape by die casting. The pivot holder 4 is formed as a part of a wiper frame that is integral with the wiper pivot 1. The pivot holder 4 has a cylindrical bearing portion 41, which rotatably supports the pivot shaft 3. The bearing portion 41 has, at its middle, an integral flange 42. The flange 42 includes fitting holes 43 in which bolts 44 are inserted respectively. The pivot holder 4 is fixed to a panel of a vehicle body (body of a vehicle) 10 using bolts 44 and nuts 45.

The pivot holder 4 rotatably supports the pivot shaft 3 through a pair of bearings 47. The distal end portion of the pivot shaft 3 protrudes from the distal end of the pivot holder 4. The pivot shaft 3 has, at its distal end, a fixing section 35 for fixing the wiper arm 2 at the proximal end portion. The fixing section 35 has a threaded portion 37, which is inserted in a fastening hole 21 of the wiper arm 2 and is engaged with a nut, and a rotation preventing portion 36 to be received in the hole 21. The rotation preventing portion 36 is tapered to have a truncated conical shape, and the surface of the rotation preventing portion 36 is knurled. The proximal end of the pivot shaft 3 protrudes from the proximal end of the pivot holder 4 and is fixed to one end of a pivot lever 8. The other end of the pivot lever 8 is connected to a wiper drive mechanism (not shown).

The pivot shaft 3 is arranged such that the pivot lever 8 and the proximal end face of the cylindrical bearing portion 41 are located close to each other. A toothed washer 5, which serves as a locking member, is fitted to a large-diameter section 32 of the pivot shaft 3 from the distal end thereof. In other words, the toothed washer 5 is located in the proximity of the distal end face of the cylindrical bearing portion 41 (i.e., in a position where axial movement of the pivot shaft 3 is restricted). The toothed washer 5 constricts the large-diameter section 32 with a predetermined constricting force. In other words, the constricting force locks the toothed washer 5 against the large-diameter section 32 by maximum static friction P1.

Thus, the cylindrical bearing portion 41 of the pivot holder 4 is located between the toothed washer 5 and the pivot lever 8, and the pivot shaft 3 is rotatably supported by the pivot holder 4 while axial movement is restricted.

Figure 3:
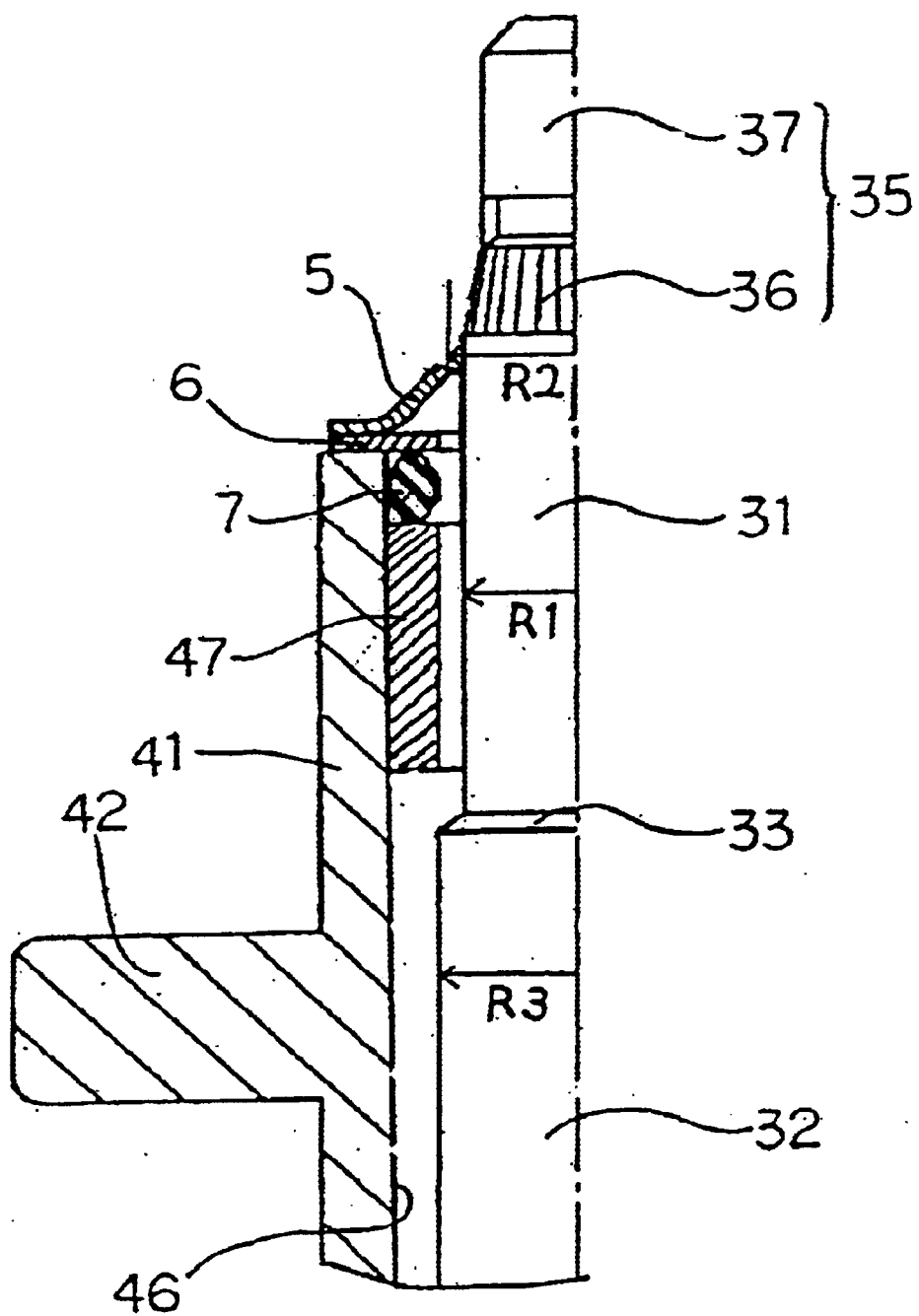
FIG. 3 is a partial cross-sectional view showing a major section of the wiper pivot shown in FIG. 2.

The pivot shaft 3 has a small-diameter section 31, which has a diameter R1, a large-diameter section 32, which has a diameter R3 and a tapered face 33, which is formed at the boundary between them (see FIG. 3). In the initial state, in which no load is applied, the majority of the large-diameter section 32 is covered with the cylindrical bearing portion 41. The pivot shaft 3 is supported pivotally with respect to the cylindrical bearing portion 41 by the bearings 47, which are between the cylindrical bearing portion 41 and the large-diameter section 32.

Figure 5A:
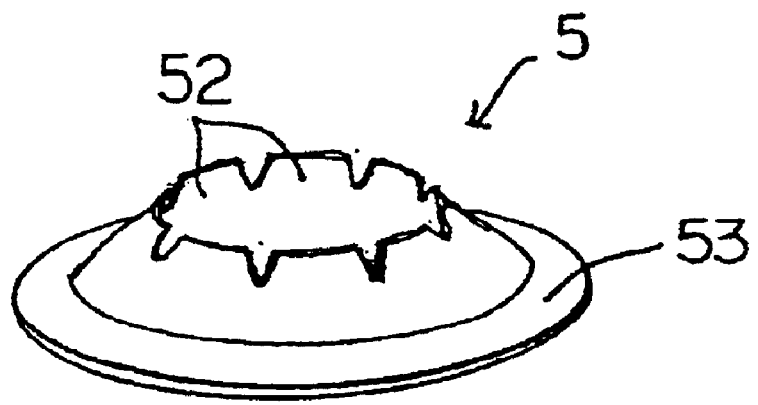
FIG. 5(a) is a perspective view of the toothed washer.
Figure 5B:
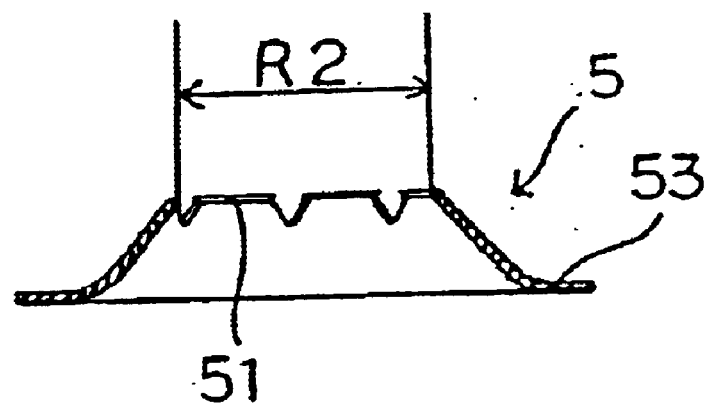
FIG. 5(b) is a cross-sectional view of the toothed washer.

As shown in FIGS. 5(a) and 5(b), the toothed washer 5 is substantially annular and has a disc-shaped flat seat 53 and a plurality of locking pieces 52, which can elastically deform. The locking pieces 52 define a through hole 51. The through hole 51 has a diameter R2 in the initial state. The diameter R2 has the following relationship with the diameter R1 of the small-diameter section 31 and the diameter R3 of the large-diameter section 32: R3>R2≧R1.

The toothed washer 5 can prevent the pivot shaft 3 from moving axially when a thrust load P applied to it is not more than a predetermined value (the withstand load, or the maximum static friction of the toothed washer 5). If the load P exceeds the withstand load of the toothed washer 5 (the maximum static friction between the toothed washer 5 and the pivot shaft 3) P1, the restriction against axial movement of the pivot shaft 3 with respect to the pivot holder 4 is cancelled. That is, the pivot shaft 3 is allowed to move axially with respect to the pivot holder 4. The withstand load or the maximum static friction P1 of the toothed washer 5 is preset, for example, to about 2400 N.

Figure 4:
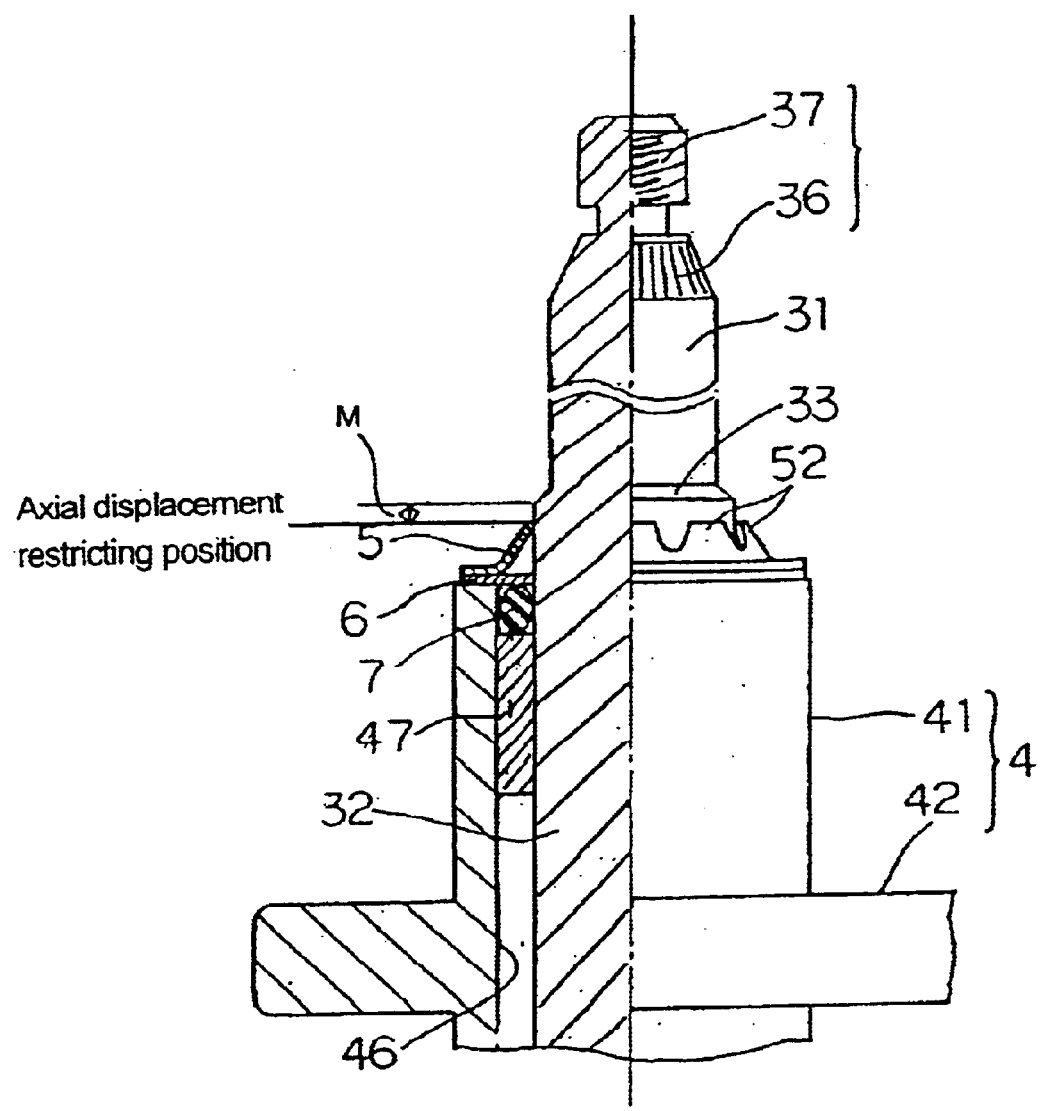
FIG. 4 is a partial cross-sectional view showing a wiper pivot in a state where axial movement is restricted.

As shown in FIG. 4, in the state where the toothed washer 5 is located at the thrust restricting position, where it restricts axial movement of the pivot shaft 3, or in the state where the toothed washer 5 is located at a position spaced by the distance M from the tapered face 33 toward the proximal end side of the pivot shaft 3, the toothed washer 5 rotates together with the pivot shaft 3. Therefore, a ring washer 6 is preferably placed between the distal end face of the cylindrical bearing portion 41 and the toothed washer 5. Further, an O-ring 7 is preferably located between the outer surface of the pivot shaft 3 and the internal surface 46 of the cylindrical bearing portion 41 for waterproofing. The O-ring 7 is prevented by the ring washer 6 from slipping.

Operation of the first embodiment will be described below.

In the wiper pivot 1 when, in the normal service condition, the wiper arm 2 reciprocates in a predetermined range under rotation of the pivot shaft 3, which is rotatably supported by the pivot holder 4, to wipe raindrops and the like from the surface of a window-shielding glass. Since the cylindrical bearing portion 41 is located between the toothed washer 5 and the pivot lever 8, the pivot shaft 3 can be rotated freely with respect to the pivot holder 4 without axial movement, as long as the load P is not more than the withstand load P1 of the toothed washer 5.

Next, a case where the thrust load P of the pivot shaft 3 acts upon the wiper pivot 1, as shown in FIG. 1 is discussed. Here, the load P may be an axial component force of the load P', which is indicated by a broken line.

Figure 2:
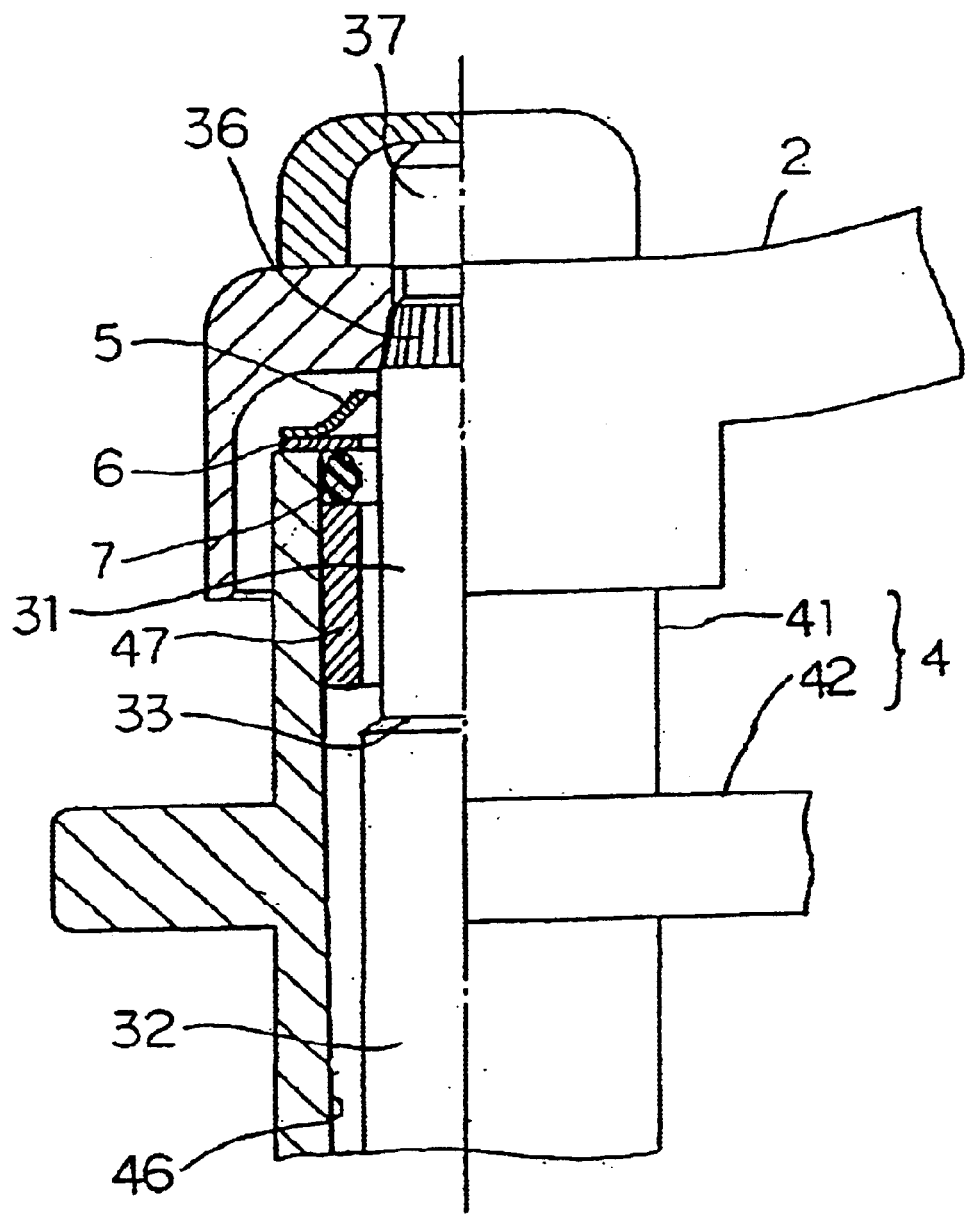
FIG. 2 is a partial cross-sectional view showing a state where the pivot shaft in the wiper pivot shown in FIG. 1 is shifted downward.

If the value of the load P exceeds the withstand load P1 of the toothed washer 5, the restriction against axial movement of the pivot shaft 3 is removed. More specifically, the pivot shaft 3 starts descending with respect to the toothed washer 5 while the locking pieces 52 of the toothed washer 5 are in contact with the outer circumference of the pivot shaft 3. The pivot shaft 3 then retracts together with the wiper arm 2 toward the inside of the vehicle body, as shown in FIG. 2, to absorb the load P acted upon the wiper pivot 1.

The locking pieces 52 constrict the large-diameter section 32 at a location that is a very small distance M from the boundary between the large-diameter section 32 and the tapered face 33. Accordingly, the tips of the locking pieces 52 (toothed washer 5) shift to the small-diameter section 31 as soon as the pivot shaft 3 retracts into the vehicle body (into the cylindrical bearing portion 41). The locking pieces 52, which were elastically deformed, then return to their natural states, and the through hole 51 return to the inside diameter R2. Since the inside diameter R2 of the toothed washer 5, the diameter R1 of the small-diameter section 31 and the diameter R3 of the large-diameter section 32 have the relationship of R3>R2≧R1, the toothed washer 5 loses its constricting force against the pivot shaft 3. Thus, the pivot shaft 3 is allowed to move axially with no contact load created by the toothed washer 5. Further, the preset load at which axial movement of the pivot shaft 3 is permitted can be controlled easily.

In the state where axial movement of the pivot shaft 3 is restricted, the majority of the large-diameter section 32 of the pivot shaft 3 is located in the cylindrical bearing portion 41, and the majority of the small-diameter section 31 protrudes from the bearing portion 41. Thus, the contact load between the pivot shaft 3 and the toothed washer 5, when the pivot shaft is axially moved, is reduced substantially over the length of the small-diameter section 31. Consequently, axial movement of the pivot shaft 3 and fitting of the toothed washer 5 onto the pivot shaft 3 can be performed smoothly.

More specifically, in a process of fitting the toothed washer 5 to the pivot shaft 3, the toothed washer 5 can be fitted to the pivot shaft 3 easily with no insertion load as far as the small-diameter section 31, because of the dimensional relationship as described above. The tapered face 33 formed at the boundary between the small-diameter section 31 and the large-diameter section 32 guides the toothed washer 5 easily from the small-diameter section 31 to the large-diameter section 32. In addition, since the thrust restricting position is located beyond the tapered face 33 and at a very small distance M from the tapered face 33, the toothed washer 5 can be fitted to the pivot shaft 3 without requiring a great force, regardless of the length of the pivot shaft 3 protruding from the distal end of the cylindrical bearing portion 41 (the protrusion length of the pivot shaft 3).

Further, the wiper arm 2 is fixed to the fixing section 35 formed at the distal end of the small-diameter section 31. Accordingly, the axial displacement range H of the pivot shaft 3 is from the thrust restricting position to the lower end of the fixing section 35 or to the position where the toothed washer 5 is abutted against the wiper arm 2. Thus, the pivot shaft 3 is prevented from slipping off from the cylindrical bearing portion 41, which facilitates recovery of the wiper pivot 1.

Figure 6:
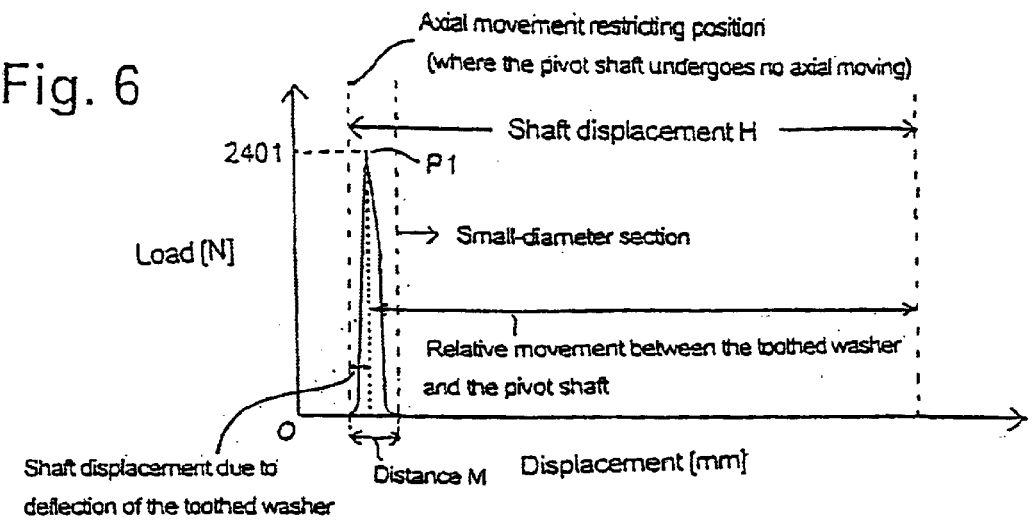
FIG. 6 is a graph of a load occurring between the pivot shaft and the toothed washer vs. displacement of the pivot shaft in a first embodiment of the present invention.

FIG. 6 shows displacement of the pivot shaft 3 when the shaft 3 is moved axially vs. resistance between the pivot shaft 3 and the toothed washer 5, in the wiper pivot 1 of the first embodiment.

The toothed washer 5 is made of a stainless steel material, and the through hole 51 has an inside diameter R2 of 11.8 mm. The pivot shaft 3 is made of a carbon steel material, and the diameter R3 of the large-diameter section 32 and the diameter R1 of the small-diameter section 31 are 12 mm and 11.7 mm, respectively.

Figure 8:
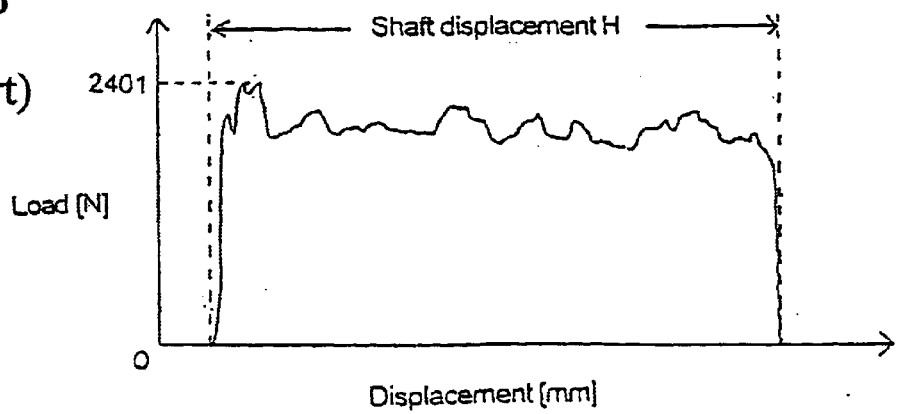
FIG. 8 is a graph of a load occurring between the pivot shaft and the toothed washer vs. displacement of the pivot shaft in the prior art.

FIG. 8 shows a graph relating to a wiper pivot of the prior art as a comparative example. In the wiper pivot of the prior art, the pivot shaft has no small-diameter section 31, but has a diameter that is the same as the large-diameter section 32 (12 mm) over the entire displacement range (throughout the range of displacement measurement).

As is shown in FIG. 6, in the first embodiment, although a displacement of a very small distance M or less such that the toothed washer 5 shifts to the small-diameter section 31 requires temporarily a load of at least about 2400 N, which corresponds to the maximum static friction, the load is nullified as soon as the toothed washer 5 reaches the small-diameter section 31. The prior art, shown in FIG. 8, requires a load of about 2400 N, which corresponds to the maximum static pressure regardless of the displacement position. In addition, the load fluctuated greatly.

As is clear from the above description, according to the wiper pivot 1 of the first embodiment of the present invention, axial movement of the pivot shaft 3 is restricted by the washer 5 in normal use. In the case where a thrust load P exceeding a predetermined value acts upon the pivot shaft 3, the prevention of axial movement by the toothed washer 5 is discontinued to allow the pivot shaft 3 to shift downward along the cylindrical bearing portion 41. Since the toothed washer 5 shifts from the large-diameter section 32 of the pivot shaft 3 to the small-diameter section 31, the constricting force of the toothed washer 5 drops suddenly to permit smooth shifting of the pivot shaft 3.

Next, a second embodiment of the present invention will be described. The basic structure of the second embodiment is similar to that of the first embodiment. However, the toothed washer 5 is designed to have an inside diameter R2 that causes the load to fall to half as much as or less than the maximum static friction force between the toothed washer 5 and the pivot shaft 3. More specifically, the inside diameter R2 of the toothed washer 5 is designed to be smaller than the diameter R1 of the small-diameter section 31; that is, R3>R1>R2.

In other words, in the first embodiment, the small-diameter section 31 and the toothed washer 5 were designed to have a diameter R1 and an inside diameter R2, respectively, to create a load of zero when the toothed washer 5 is shifted to the small-diameter section 31. However, in the second embodiment, the diameters R1, R2 and R3 are designed such that they do not prevent the pivot shaft 3 from moving axially. More specifically, the small-diameter section 31 of the pivot shaft 3 is designed to have a diameter R1 of 11.86 mm. The other conditions are the same as in the first embodiment.

Figure 7:
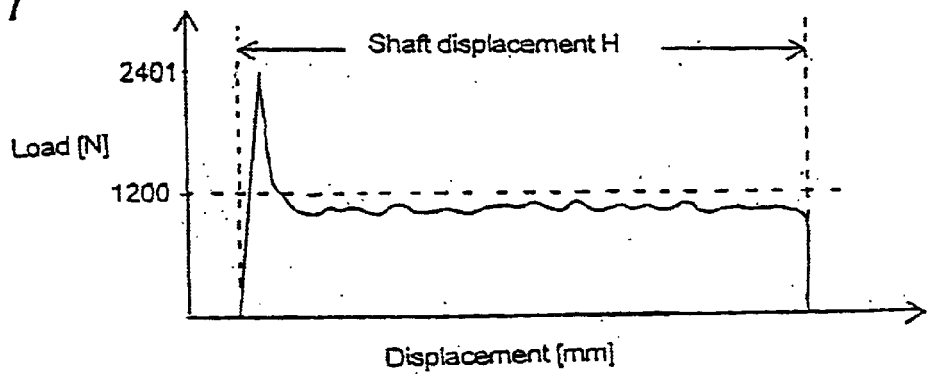
FIG. 7 is a graph of a load occurring between the pivot shaft and the toothed washer vs. displacement of the pivot shaft in the second embodiment of the present invention.

FIG. 7 shows a graph of displacement vs. load in the second embodiment. According to this graph, a load of about 2400 N corresponding to the maximum static friction is temporarily required when the toothed washer 5 starts shifting from the large-diameter section 32 of the pivot shaft 3 (more specifically from the thrust restricting portion). Once the toothed washer 5 shifted to the small-diameter section 31, the load drops suddenly, and the toothed washer 5 is allowed to move smoothly with a load of half as much as or less (about 980 N to about 1176 N) than that at the thrust restricting portion.

As described above, in the wiper pivot 1 according to the second embodiment of the present invention, the load when the pivot shaft 3 moves axially is reduced to allow smooth movement of the pivot shaft 3.

The first embodiment and the second embodiment can be modified as described below.

The small-diameter section 31 has a uniform diameter in the above embodiments. The structure of the small-diameter section 31 is not so limited but may have a plurality of steps, may have a taper or may be a combination of such. That is, it is important that the distal end of the pivot shaft 3 has a small diameter, except for at least the fixing section 35, compared with the large-diameter section 32.

Although a toothed washer is used as the locking member, a C-ring (a severed ring), an E ring or the like may be used.

What is claimed is:

1. A wiper pivot unit comprising: a pivot shaft having a proximal end and a distal end to which a wiper arm is fixed;
    a pivot holder fixed to a vehicle body;
    a bearing portion formed in the pivot holder and rotatably supporting the pivot shaft; and a locking member for restricting axial movement of the pivot shaft with respect to the bearing portion, wherein the pivot shaft includes a small-diameter section formed over a predetermined length from the distal end side, and a large-diameter section, which has a diameter larger than that of the small-diameter section, formed on the proximal end side, the large-diameter section having an end portion in the proximity of the small-diameter section, wherein the locking member is engaged with a predetermined frictional force against an external surface at the end portion of the large-diameter section, wherein when a thrust load of a predetermined value or more is applied to the pivot shaft toward the proximal end, restriction of axial movement of the pivot shaft by the locking member is removed, the pivot shaft starts moving with respect to the bearing portion, the locking member is moved to the small-diameter section, the frictional force is reduced, and the thrust load required to move the pivot shaft is reduced to substantially half of the thrust load that is required to start moving the pivot shaft with respect to the bearing portion.

2. The wiper unit according to claim 1, wherein the predetermined frictional force is a result of a constricting force of the locking member against the outer surface of the pivot shaft.

3. The wiper pivot unit according to claim 1, wherein the small-diameter section protrudes entirely from the bearing portion and the large-diameter section is located in the bearing portion in the state where the locking member restricts axial movement of the pivot shaft with respect to the bearing portion.

4. The wiper pivot unit according to claim 1, wherein the small-diameter section has a constant diameter along the axis of the pivot shaft and protrudes from the bearing portion.

5. The wiper pivot unit according to claim 1, wherein the pivot shaft further has a fixing section for fixing the wiper arm at the distal end side of the small-diameter section, wherein the small-diameter section is formed over a predetermined length between the fixing section and the large-diameter section.

6. The wiper pivot unit according to claim 5, wherein the fixing section has a tapered rotation preventing portion having a knurled surface and a threaded portion formed on the distal end side of the rotation preventing portion.

7. The wiper pivot unit according to claim 1, wherein the pivot shaft has a tapered surface, which connects the large-diameter section and the small-diameter section.

8. The wiper pivot unit according to claim 1, wherein the locking member includes a ring-shaped toothed washer having a plurality of locking pieces protruding inward, the locking pieces defining a through hole, wherein the diameter of the small-diameter section, the diameter of the large-diameter section and the inside diameter of the through hole of the toothed washer before it is fitted to the pivot shaft are designed to produce a kinetic frictional force between the toothed washer and the small-diameter section of substantially half of a maximum static friction to that occurs when the toothed washer constricts the large-diameter section.

9. The wiper pivot unit according to claim 1, wherein the locking member includes a toothed washer having a plurality of locking pieces protruding inward, wherein the washer has an unsevered ring shape.

10. A wiper pivot unit comprising: a pivot shaft having a proximal end and a distal end to which a wiper arm is fixed;
    a pivot holder fixed to a vehicle body;
    a bearing portion formed in the pivot holder to support rotatably the pivot shaft; and
    a locking member for restricting axial movement of the pivot shaft with respect to the bearing portion, wherein the pivot shaft includes a small-diameter section formed over a predetermined length from the distal end side, and a large-diameter section, which has a diameter larger than that of the small-diameter section, formed on the proximal end side, the large-diameter section having an end portion in the proximity of the small-diameter section, wherein the locking member includes a toothed washer having a plurality of locking pieces protruding inward, tips of the locking pieces defining a through hole, and the toothed washer is engaged with the outer surface at the end portion of the large-diameter section to constrict that portion with a predetermined constricting force, and wherein the diameter of the small-diameter section, the diameter of the large-diameter section and the inside diameter of the toothed washer before it is fitted to the pivot shaft are designed to allow the toothed washer to give a kinetic frictional force of substantially half of a maximum static friction to be exhibited when the restriction of axial movement of the pivot shaft is canceled to allow the pivot shaft to shift with respect to the bearing portion.

11. The wiper pivot unit according to claim 10, wherein the small-diameter section protrudes entirely from the bearing portion and the large-diameter section is located in the bearing portion in the state where the locking member restricts axial movement of the pivot shaft.

12. The wiper pivot unit according to claim 10, wherein the small-diameter section has a constant diameter along the axis of the pivot shaft and protrudes from the bearing portion.

13. The wiper pivot unit according to claim 10, wherein the pivot shaft further has a fixing section for fixing the wiper arm at the distal end side of the small-diameter section, wherein the small-diameter section is formed over a predetermined length between the fixing section and the large-diameter section.

14. The wiper pivot unit according to claim 13, wherein the fixing section has a tapered rotation preventing portion having a knurled surface and a threaded portion formed on the distal end side of the rotation preventing portion.

15. The wiper pivot unit according to claim 10, wherein the pivot shaft has a tapered surface, which connects the large-diameter section and the small-diameter section.

16. The wiper pivot unit according to claim 10, wherein the locking member includes a toothed washer having a plurality of locking pieces protruding inward, wherein the washer has an unsevered ring shape.

17. A wiper pivot unit comprising: a pivot shaft having an outer surface, a proximal end, and a distal end to which a wiper arm is fixed, wherein the pivot shaft includes a small-diameter section formed over a predetermined length from the distal end side, and a large-diameter section, which has a diameter larger than that of the small-diameter section, formed on the proximal end side, the large-diameter section having an end portion in the proximity of the small-diameter section;

a pivot holder fixed to a vehicle body;

a bearing portion formed in the pivot holder and rotatably supporting the pivot shaft and having a proximal end, a distal end, and an inner surface which faces the outer surface of the pivot shaft; and a locking member for restricting axial movement of the pivot shaft with respect to the bearing portion, wherein the locking member is engaged with a predetermined frictional force against an external surface at the end portion of the large-diameter section, wherein when a thrust load of a predetermined value or more is applied to the pivot shaft toward the proximal end, the locking member allows to start axially moving the pivot shaft with respect to the bearing portion, and wherein when the locking member meets with the small diameter section, the thrust load required to move the pivot shaft is reduced by substantially half of the predetermined value.

* * * * *